(12) United States Patent
Olson, Jr. et al.

(10) Patent No.: US 10,107,540 B2
(45) Date of Patent: Oct. 23, 2018

(54) REFRIGERANT SYSTEM WITH LIQUID LINE TO HARVEST LINE BYPASS

(71) Applicant: Manitowoc Foodservice Companies, LLC, Manitowoc, WI (US)

(72) Inventors: William E. Olson, Jr., Bellevue, WI (US); Cary J. Pierskalla, Manitowoc, WI (US); Thomas H. Antoine, Port Washington, WI (US); Dean M. Petersen, Manitowoc, WI (US)

(73) Assignee: MANITOWOC FOODSERVICE COMPANIES, LLC, New Port Richey, FL (US)

( * ) Notice: Subject to any disclaimer, the term of this patent is extended or adjusted under 35 U.S.C. 154(b) by 12 days.

(21) Appl. No.: 15/223,891

(22) Filed: Jul. 29, 2016

(65) Prior Publication Data

US 2018/0031294 A1  Feb. 1, 2018

(51) Int. Cl.
| | |
|---|---|
| *F25C 5/10* | (2006.01) |
| *F25B 41/04* | (2006.01) |
| *F25B 43/00* | (2006.01) |
| *F16K 15/04* | (2006.01) |

(52) U.S. Cl.
CPC ............... *F25C 5/10* (2013.01); *F16K 15/04* (2013.01); *F25B 41/04* (2013.01); *F25B 43/003* (2013.01); *F25B 2400/0403* (2013.01); *F25B 2600/2501* (2013.01)

(58) Field of Classification Search
CPC .... F25C 5/10; F25C 5/20; F25C 5/005; F25C 5/007; F25C 1/04; F25C 1/25; F25B 41/04; F25B 43/003; F25B 2600/2501; F25B 2400/0403; F16K 15/04

USPC ................... 62/196.4, 278, 81, 277
See application file for complete search history.

(56) References Cited

U.S. PATENT DOCUMENTS

| | | | |
|---|---|---|---|
| 5,042,263 | A | 8/1991 | Day et al. |
| 5,218,830 | A | 6/1993 | Martineau |
| 6,196,007 | B1 | 3/2001 | Schlosser et al. |
| 6,711,910 | B2 | 3/2004 | Ziolkowski et al. |
| 9,052,130 | B2 | 6/2015 | Schlosser |
| 2002/0073728 | A1* | 6/2002 | Stensrud ............... F25B 41/043 62/340 |

(Continued)

OTHER PUBLICATIONS

International Search Report dated Oct. 13, 2016 for PCT application No. PCT/US2016/044776.

(Continued)

*Primary Examiner* — Mohammad M Ali
(74) *Attorney, Agent, or Firm* — Ohlandt, Greeley, Ruggiero & Perle, LLP

(57) ABSTRACT

A refrigerant system includes a compressor connected to a first valve forming a harvest line, a condenser connected to the compressor by a first segment of conduit and an expansion device by a second segment of conduit with the condenser and the second segment of conduit forming a liquid line. A third segment of conduit is connected to the liquid line and the harvest line with the third segment of conduit having a second valve. The second valve allows flow of refrigerant from the liquid line to the harvest line through the third segment of conduit in an open position and the second valve blocking flow of the refrigerant from the liquid line to the harvest line through the third segment of conduit in a closed position.

17 Claims, 13 Drawing Sheets

(56) References Cited

U.S. PATENT DOCUMENTS

| | | | |
|---|---|---|---|
| 2002/0095944 A1* | 7/2002 | Stensrud | F25B 41/04 |
| | | | 62/352 |
| 2004/0035136 A1* | 2/2004 | Gist | F25B 41/043 |
| | | | 62/340 |
| 2005/0081545 A1* | 4/2005 | Gist | F25B 41/043 |
| | | | 62/217 |
| 2012/0198870 A1* | 8/2012 | Erbs | F25C 1/12 |
| | | | 62/126 |

OTHER PUBLICATIONS

Written Opinion dated Oct. 13, 2016 for PCT application No. PCT/US2016/044776.

\* cited by examiner

REFRIGERANT SYSTEM WITH LIQUID LINE TO HARVEST LINE BYPASS

BACKGROUND OF THE DISCLOSURE

1. Field of the Disclosure

The present disclosure relates generally to refrigerant systems. More particularly, the present disclosure relates to a refrigerant system having a liquid line to harvest line bypass.

2. Description of Related Art

Conventional commercial batch-style ice making machines bring in a certain amount of potable water, freeze a portion of that water into ice, harvest that ice, then repeat the process. These machines have one or more evaporators for the freezing and harvesting of ice. For example, referring to FIG. 1, ice making assembly 30 has an ice making machine 33 that makes ice and an ice bin 31 that stores ice.

FIGS. 2 and 3 illustrate schematically a water/ice system of ice making assembly 30, but does not show the ice bin 31 or reservoir. A water supply 1 provides source water. Attached lines control and direct the flow of water from the water supply to flow into a water sump 3. The sump is equipped with a level controller 2, a solenoid dump valve 9, a drain line 10, and is connected and supplies a water supply to the suction side of the circulating pump 4. Pump 4 circulates water from sump 3 to the distributor 7, where the water is directed over an evaporator plate 6. Evaporator plate has walls 6a, 6b, 6c, 6d that form ice having a shape, e.g., cubes.

The water from the distributor 7 is directed across the evaporator plate 6 and, if not frozen to form ice on a first pass, is collected by the water curtain 5. This collected water is allowed to flow down the water curtain into the water sump or water reservoir 3, where it is collected and again circulated by the circulating pump 4 to the distributor 7 and recycled across evaporator plate 6 during a freeze cycle. Once the ice forming on the evaporator plate 6 has reached a certain thickness, the water flowing over the surface of that frozen ice product reaches contact with the ice thickness probe 8, which signals the controller to stop the freeze mode and begin a harvest mode. FIG. 4 shows an example of ice making assembly 30.

Referring to FIG. 5, evaporator plate 6 is in contact with a refrigerant system 100. Refrigerant system 100 comprises a condenser 111, evaporator 106, a compressor 114, refrigerant supply line 120, a drier 121, a receiver 122 on some units, harvest valve 123, and an expansion valve 113. Evaporator plate 6 of FIG. 4 is in thermal communication with evaporator 106 of FIG. 5.

Referring to FIG. 6, in the freeze mode, evaporator 106 has low-pressure liquid 132 that expands, absorbs heat, and evaporates, changing to a low-pressure vapor 134 in evaporator serpentine 112. Compressor 114 pumps low-pressure vapor 134 from an outlet of evaporator 106 to condenser 111 increasing the pressure of low-pressure vapor 134 forming high pressure vapor 136 at condenser 111. In condenser 111, heat is removed from high pressure vapor 136, which then condenses and becomes a high-pressure liquid 138. This high-pressure liquid 138 drains from condenser 111 into liquid line 142 and optional receiver tank 122 to provide a buffer for refrigerant as demand varies. Expansion device 113 is between condenser 111 and evaporator 106. Immediately preceding expansion device 113 is drier 121, which prevents plugging of the valve or tube by retaining scale, dirt, and moisture. As high-pressure liquid 138 enters evaporator 106, it is subjected to a much lower pressure due to the suction of compressor 114 and a pressure drop across expansion devices 113. Thus, the refrigerant tends to expand and evaporate. In order to evaporate, the liquid must absorb heat from the water passing over evaporator 106 forming low pressure liquid 132. Harvest valve 123 is closed during the freeze mode.

Referring to FIG. 7, when the ice making system goes into its harvest mode, closed harvest valve 123 is opened establishing a liquid line 142 and a harvest line 144. Harvest line 144 continuously circulates refrigerant so that high pressure vapor 136 is in compressor 114 to flow through refrigerant supply line 120 into evaporator 106; high pressure vapor 136 flows toward evaporator 106 through harvest valve 123 lowering the pressure to form low-pressure vapor 134; low-pressure vapor 134 flows through evaporator 106 lowering pressure further forming low pressure liquid 132; and low pressure liquid 132 flows from evaporator 106 to compressor 114. Liquid line 142 has high pressure vapor 136 and high pressure liquid 138 in condenser 111 between expansion device 113 and condenser 111.

Evaporator 106 is cooled by boiling refrigerant in an evaporator serpentine 112 of evaporator 106 while water is circulated over the evaporator 106 to freeze ice when the machine is in the freeze mode. Evaporator 106 is warmed by routing high pressure vapor 136 toward evaporator serpentine 112 to melt the evaporator/ice contact surface and allow gravity to pull the batch of ice off evaporator plate 6 when the machine is in the harvest mode. The refrigerant used in refrigerant system 100 can be any of a number of chemicals and chemical blends, but the need for reduced Global Warming Potential of the refrigerant has moved the industry towards using hydrocarbons (HC) as a refrigerant in refrigerant system 100. The flammable nature of HC refrigerants has driven regulatory bodies to impose limits on the maximum charge amount allowed in a single refrigeration system, for instance 150 grams.

The refrigerant charge limits imposed on these refrigerant systems necessitate design efforts to reduce system volume so refrigerant system 100 functions properly with the small charge amount. These design decisions may include microchannel condensers and shorter liquid lines in order to reduce the amount of refrigerant that is in its densest state (liquid) during the freeze mode. Nonetheless, when refrigerant system 100 transitions from the freeze mode to the harvest mode there will be a significant amount of refrigerant in a liquid state from condenser 111 to expansion device 113 in liquid line 142 that will no longer be cycling in refrigerant system 100, e.g., refrigerant in liquid line 142 will not flow to evaporator 106. As the pressure in the liquid line 142 decreases during the harvest mode and some of the liquid refrigerant boils, some amount of the refrigerant will flow backwards through condenser 111 and into a segment of refrigerant supply line 120 between compressor 114 and the harvest valve 123, but most of the refrigerant in liquid line 142 will remain stagnant until the harvest mode is completed and refrigerant system 100 returns to freeze mode.

Accordingly, it has been determined by the present disclosure, there is a need for increasing refrigerant mass flow in a low charge refrigerant system, thus increasing suction pressure and saturated suction temperature in the evaporator to better warm an evaporator and harvest a batch of ice.

SUMMARY

A refrigerant system is provided that includes a compressor connected to a first valve forming a harvest line, a condenser connected to the compressor by a first segment of conduit and an expansion device by a second segment of conduit with the condenser and the second segment of conduit forming a liquid line. A third segment of conduit is connected to the liquid line and the harvest line with the third segment of conduit having a second valve. The second valve allows flow of refrigerant from the liquid line to the harvest line through the third segment of conduit in an open position and the second valve blocking flow of the refrigerant from the liquid line to the harvest line through the third segment of conduit in a closed position.

The above-described and other advantages and features of the present disclosure will be appreciated and understood by those skilled in the art from the following detailed description, drawings, and appended claims.

DETAILED DESCRIPTION OF THE DISCLOSURE

Figure 8:
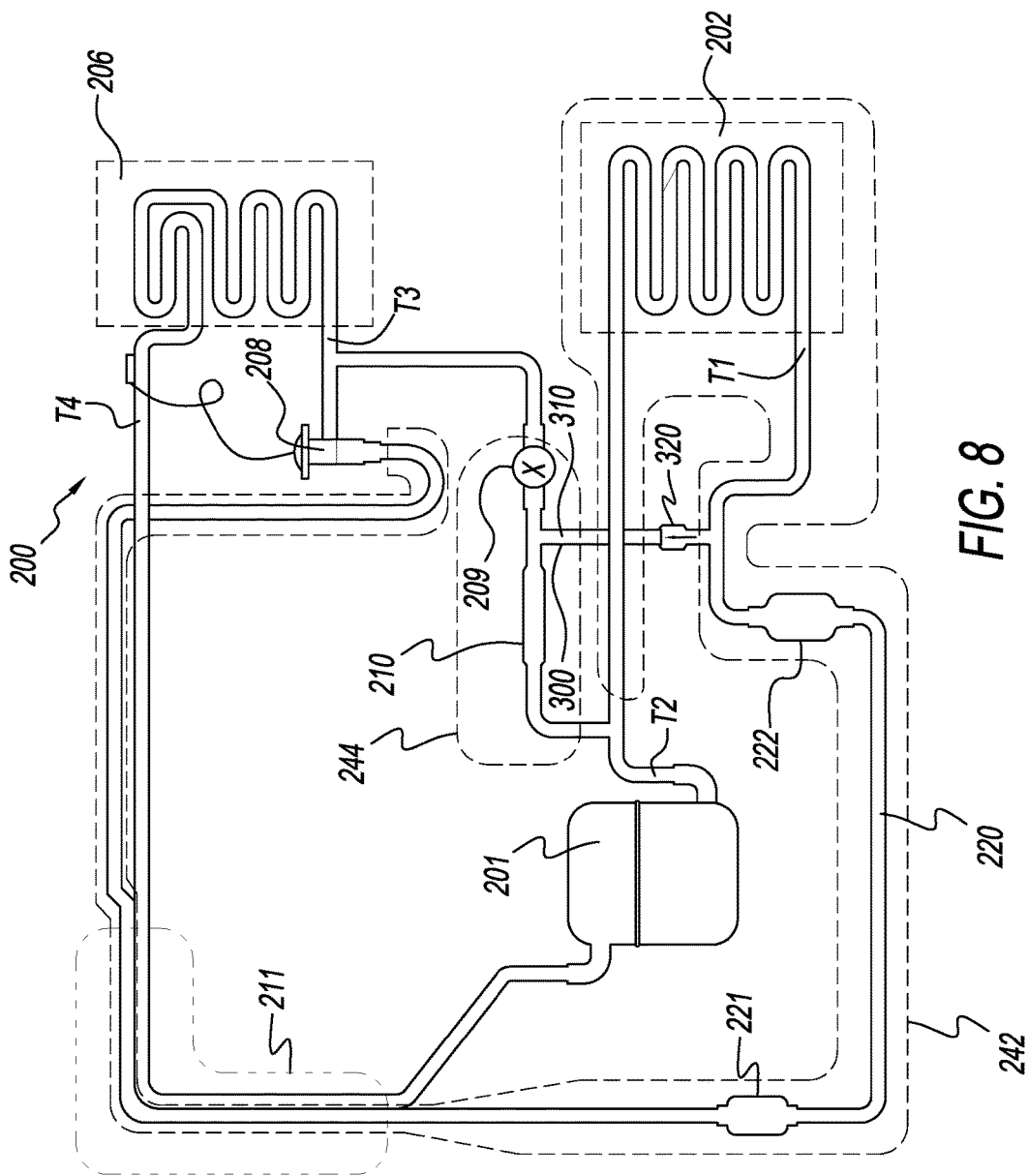
FIG. 8 provides a line diagram describing a refrigerant system having a liquid line to harvest line bypass of the present disclosure.

Referring to the drawings and in particular to FIG. 8, an exemplary embodiment of a refrigerant system of the present disclosure is generally referred to by 200. Refrigerant system 200 has a compressor 201 connected to a condenser 202. Condenser 202 is connected to an evaporator 206. Evaporator 206 is connected to compressor 201. Between the connection of compressor 201 and evaporator 206 is a harvest line valve 209. Between the connection of compressor 201 and harvest line valve 209 is a strainer 210. Between evaporator 206 and condenser 202 is an expansion valve 208, a drier 221 and a receiver 222. Compressor 201, condenser 202, evaporator 206, expansion valve 208, harvest line valve 209, strainer 210, drier 221 and optionally a receiver 222 are connected by a conduit 220. Conduit 220 can be made of a plurality of separate conduits. A portion of conduit 220 between condenser 202 and expansion valve 208 forms a liquid line 242. A portion of conduit 220 between compressor 201 and harvest line valve 209 forms a harvest line 244.

Figure 1A:
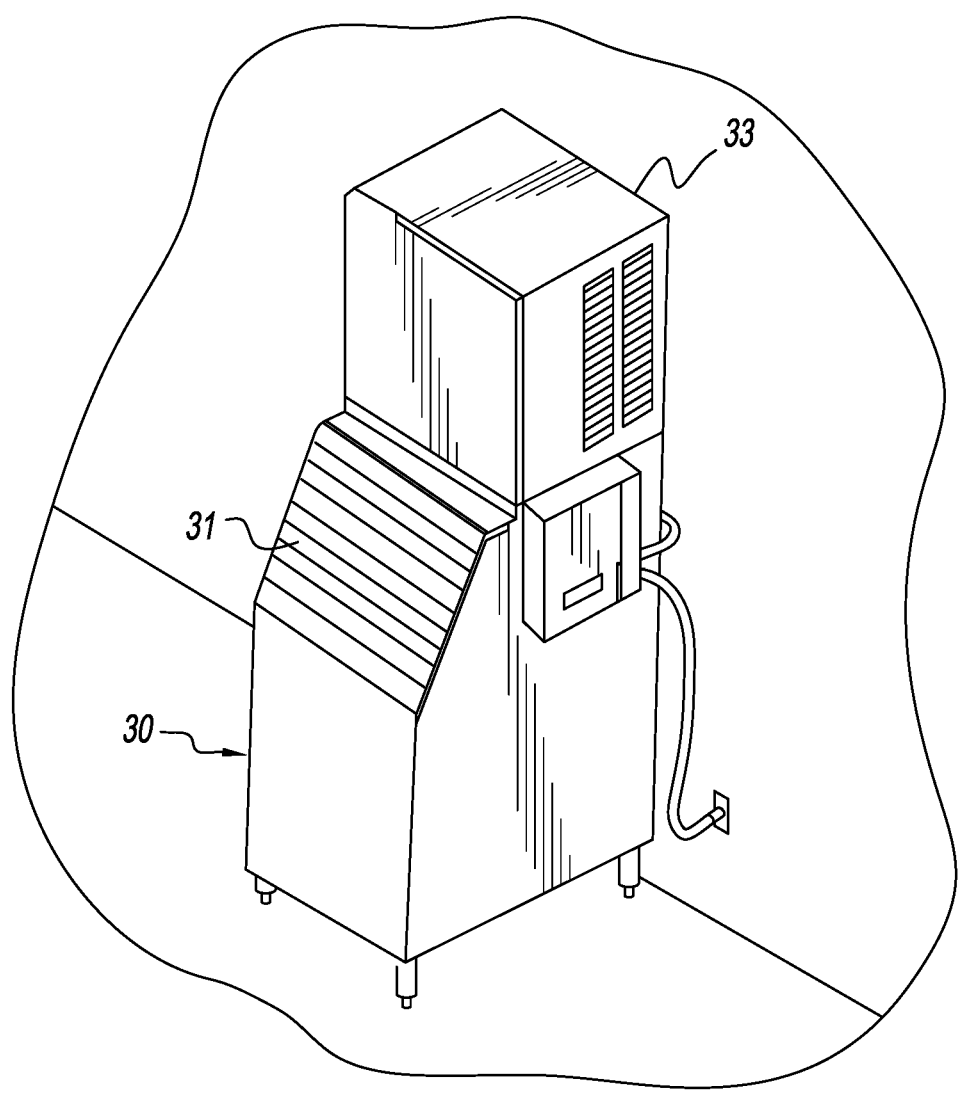
FIG. 1A provides an illustration of a conventional automatic ice making machine.
Figure 2:
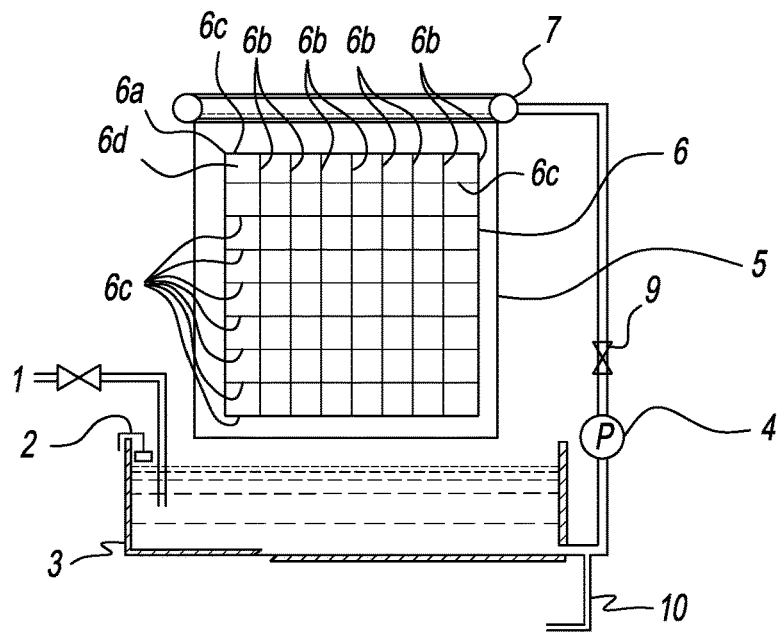
FIGS. 2 and 3 provide line diagrams and drawings for an embodiment of a water/ice system of the conventional ice machine of FIG. 1.
Figure 3:
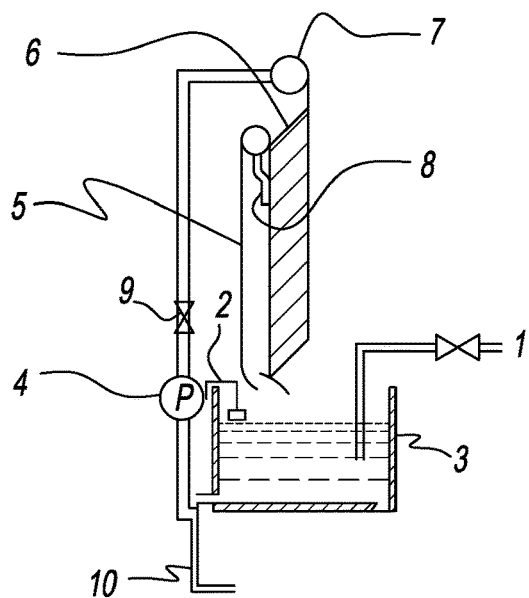
Figure 4:
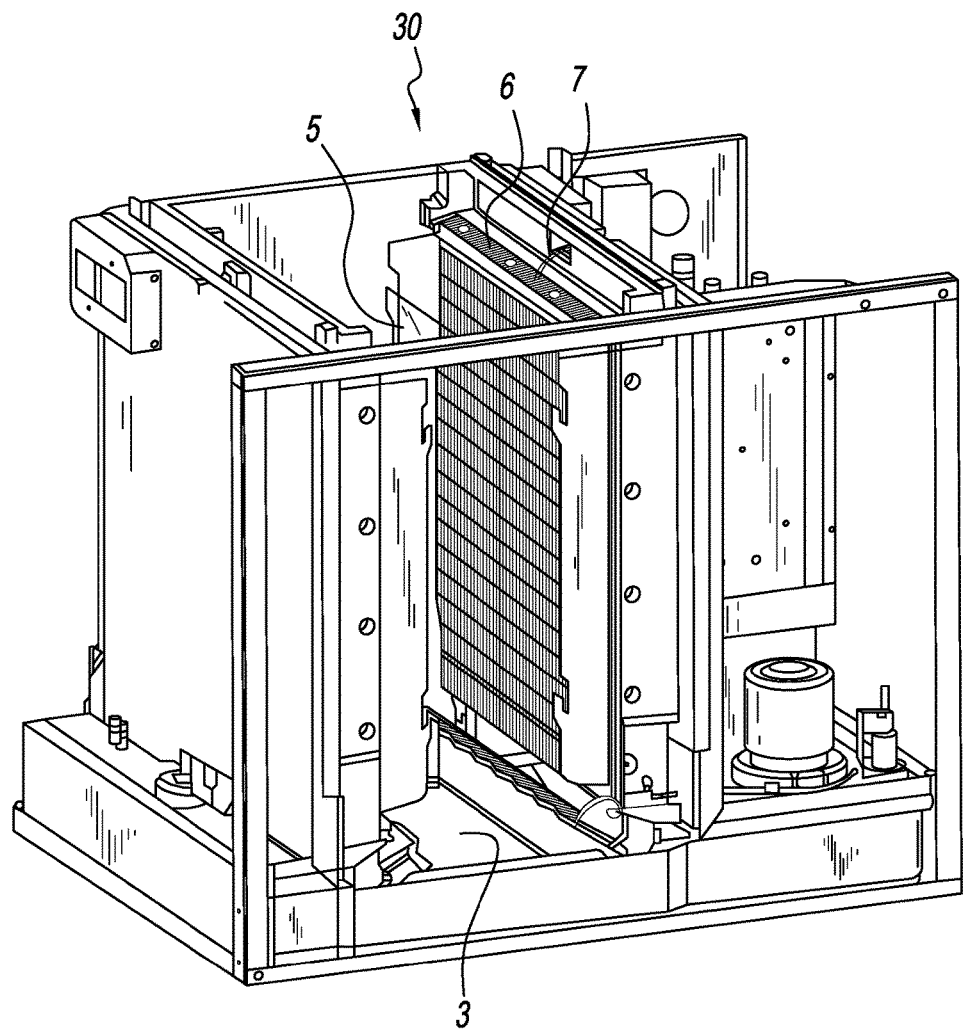
FIG. 4 is a perspective view of an ice making machine with components removed which can be adapted to have evaporator plates of the conventional ice machine of FIG. 1.
Figure 5:
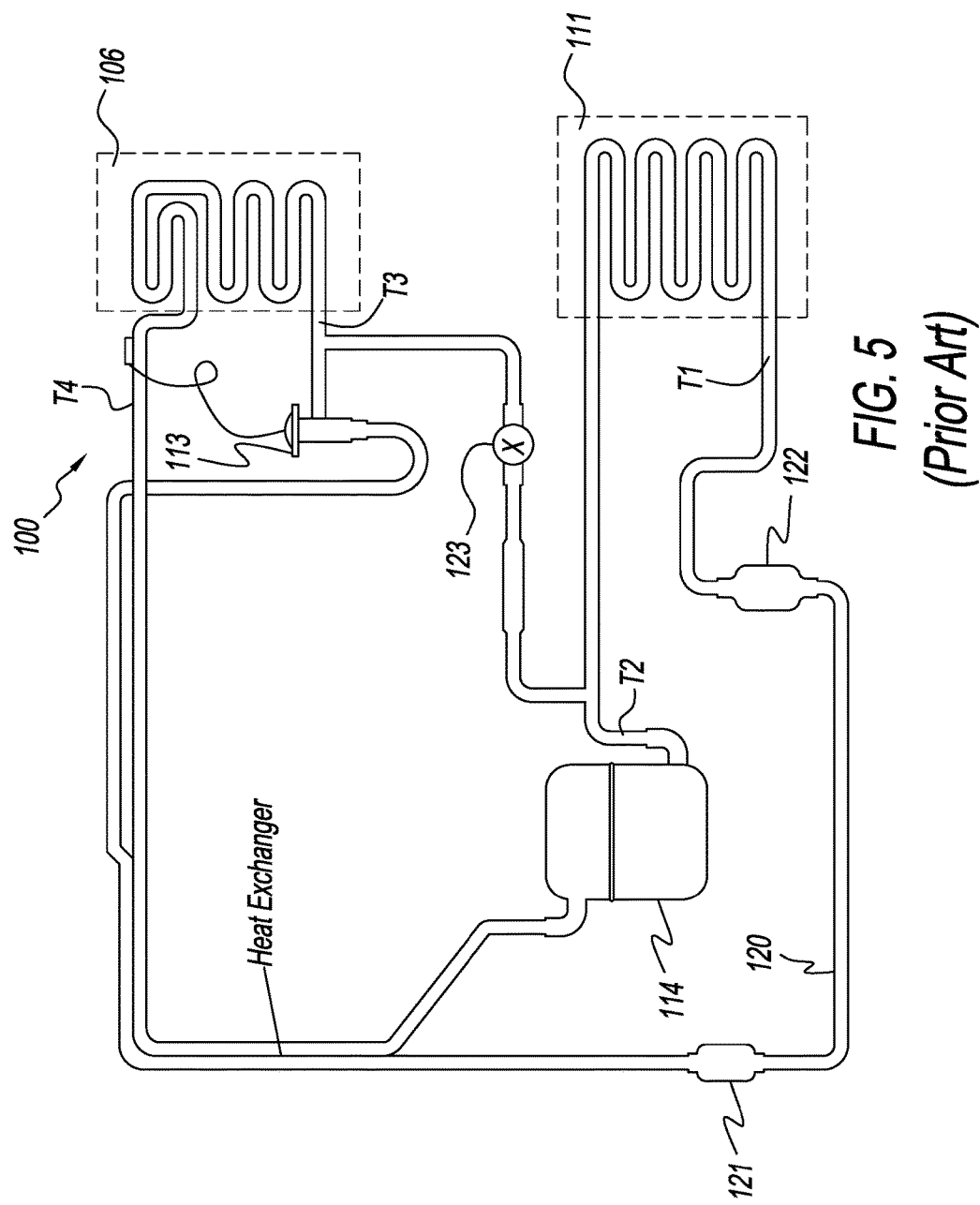
FIG. 5 provides a line diagram describing an embodiment for the refrigerant system of the conventional ice machine of FIG. 1.
Figure 6:
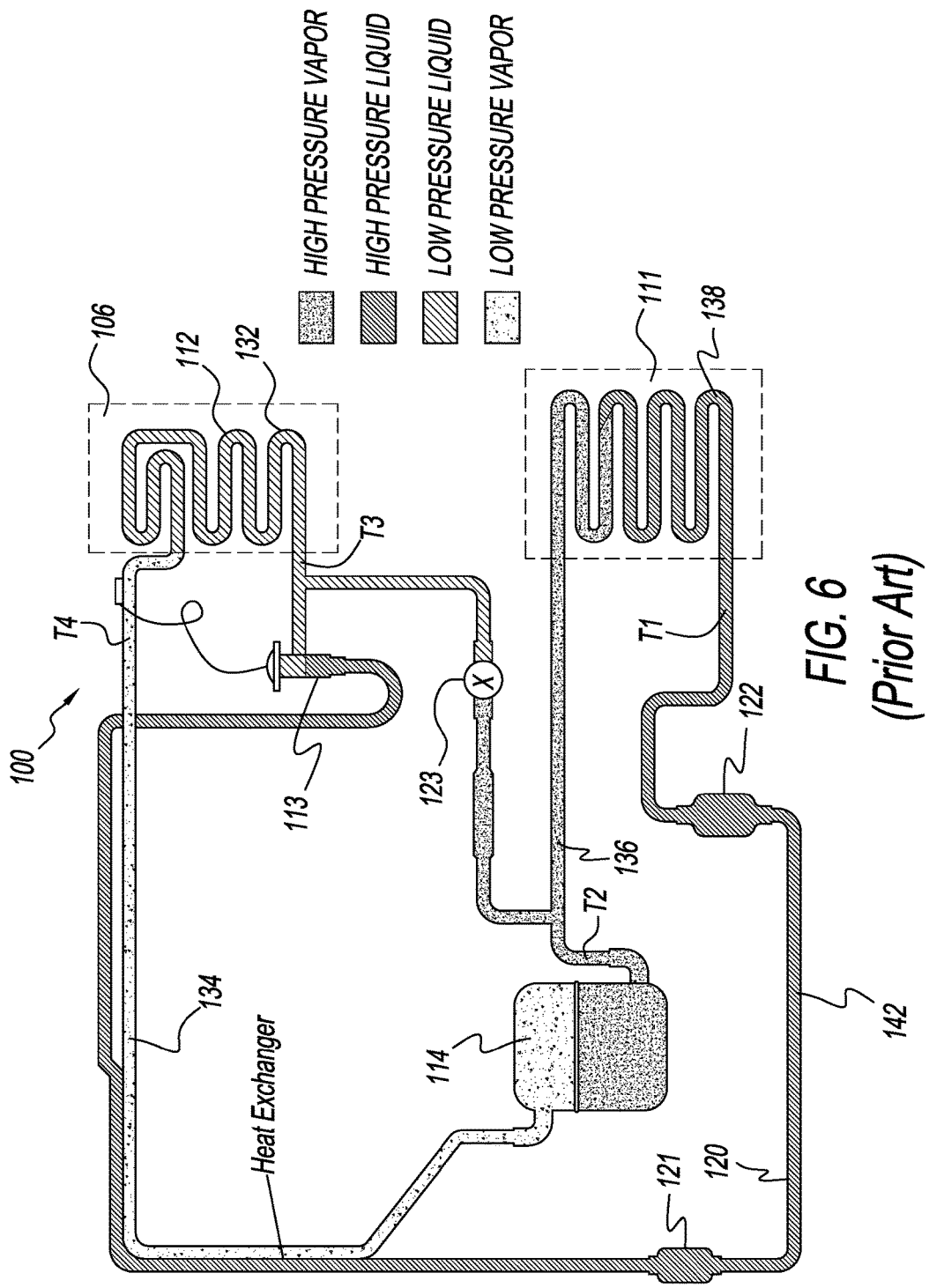
FIG. 6 provides a line diagram describing the embodiment for the refrigerant system of the conventional ice machine of FIG. 5 in a freeze mode.
Figure 7:
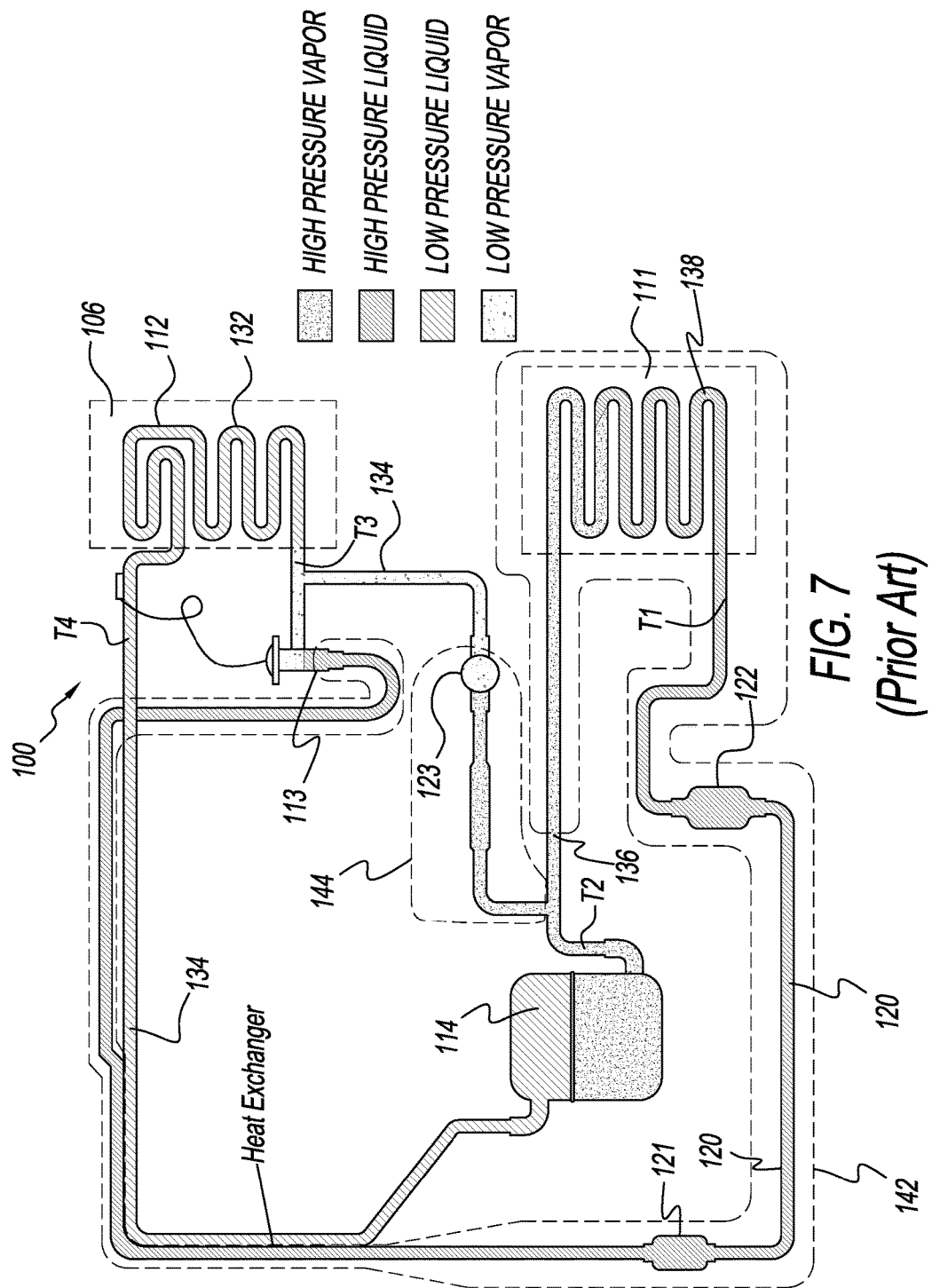
FIG. 7 provides a line diagram describing the embodiment for the refrigerant system of the conventional ice machine of FIG. 5 in a harvest mode.

A first portion of conduit 220 between evaporator 206 and compressor 201 and a second portion of conduit 220 between condenser and evaporator 206 are in thermal communication so that heat transfer occurs between the first and second portions of conduit 220. A heat exchanger 211 may be between the first and second portions of conduit 220. Evaporator plate 6 of FIG. 3 is in thermal communication with evaporator 206 of FIG. 8 to form a part of an ice maker. Refrigerant used in refrigerant system 200, for example, is a hydrocarbons refrigerant with a maximum charge of less than 150 grams.

Liquid line 242 is connected to harvest line 244 by a conduit assembly 300. Conduit assembly 300 has a conduit 310 and a valve 320. Valve 320 may be a check valve so that flow of refrigerant is only allowed in a single direction from liquid line 242 to harvest line 244. Valve 320 that is a check valve is actuated by a pressure differential so that once pressure in liquid line 242 reaches a predetermined pressure differential above harvest line 244, for example, 1 psi, a mechanism that biases valve 320 in a closed position is overcome to move valve 320 to an open position allowing flow of the refrigerant from liquid line 242 to harvest line 244. Valve 320 that is a check valve is moved to a closed position once pressure in liquid line 242 falls below the predetermined pressure differential so that the mechanism biases valve 320 into the closed position to block flow of the refrigerant between liquid line 242 to harvest line 244.

Figure 14:
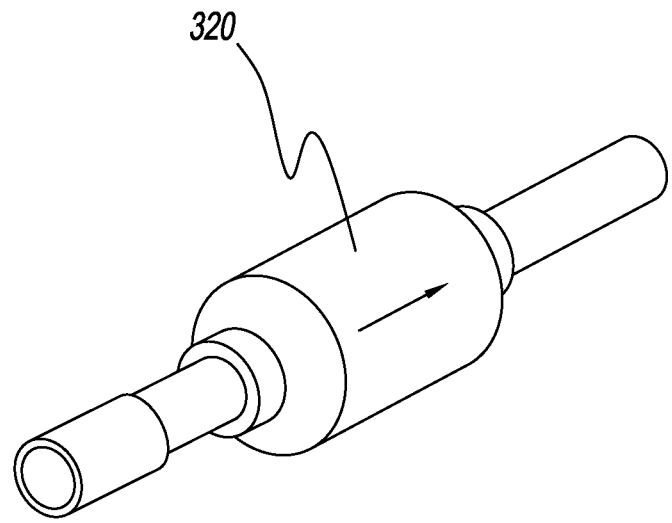
FIG. 14 is a perspective view of a check valve of the liquid line to harvest line bypass of FIG. 8.
Figure 15:
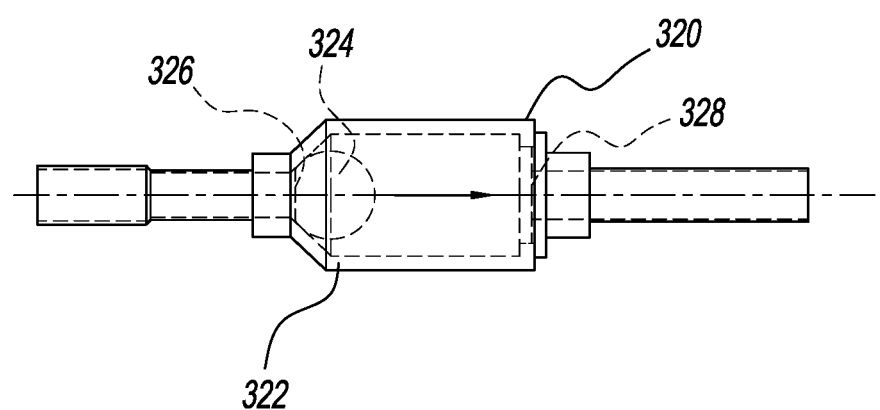
FIG. 15 is a side view of the check valve of FIG. 14.

Referring to FIGS. 14 and 15, the check valve of valve 320 can have a housing 322 and a ball 324 inside of housing 322. Housing 322 has a first opening 326 and a second opening 328. First opening 326 is connected to liquid line 242. Second opening 328 is connected to harvest line 244. Ball 324 blocks first opening 326 in the closed position so that the refrigerant cannot pass through housing 322 from first opening 326 to second opening 328. The pressure of the refrigerant in harvest line 244 urges ball 324 against housing 322 covering first opening 326 in the closed position. Ball 324 is moved from the closed position blocking first opening 326 by the pressure differential so that once pressure of the refrigerant in liquid line 242 reaches a predetermined pressure differential above pressure of the refrigerant harvest line 244, for example, 1 psi, ball 324 is moved away from first opening 326 allowing flow of the refrigerant through first opening 326, housing 322, and second opening 328 from liquid line 242 to harvest line 244. Ball 324 is moved to the closed position once pressure of the refrigerant in liquid line 242 is below the pressure differential, for example, pressure of the refrigerant in liquid line 242 is less than 1 psi above pressure of the refrigerant harvest line 244, to block flow of the refrigerant between liquid line 242 to harvest line 244. Accordingly, flow of the refrigerant is only permitted in one direction by the check valve of valve 320 from liquid line 242 to harvest line 244.

Valve 320 may be a solenoid valve. The solenoid valve maintains a closed position, and, when energized, the solenoid valve moves to an open position so that refrigerant can flow between liquid line 242 and harvest line 244. The solenoid valve is de-energized to return to the closed position blocking flow of the refrigerant between liquid line 242 and harvest line 244.

Figure 9:
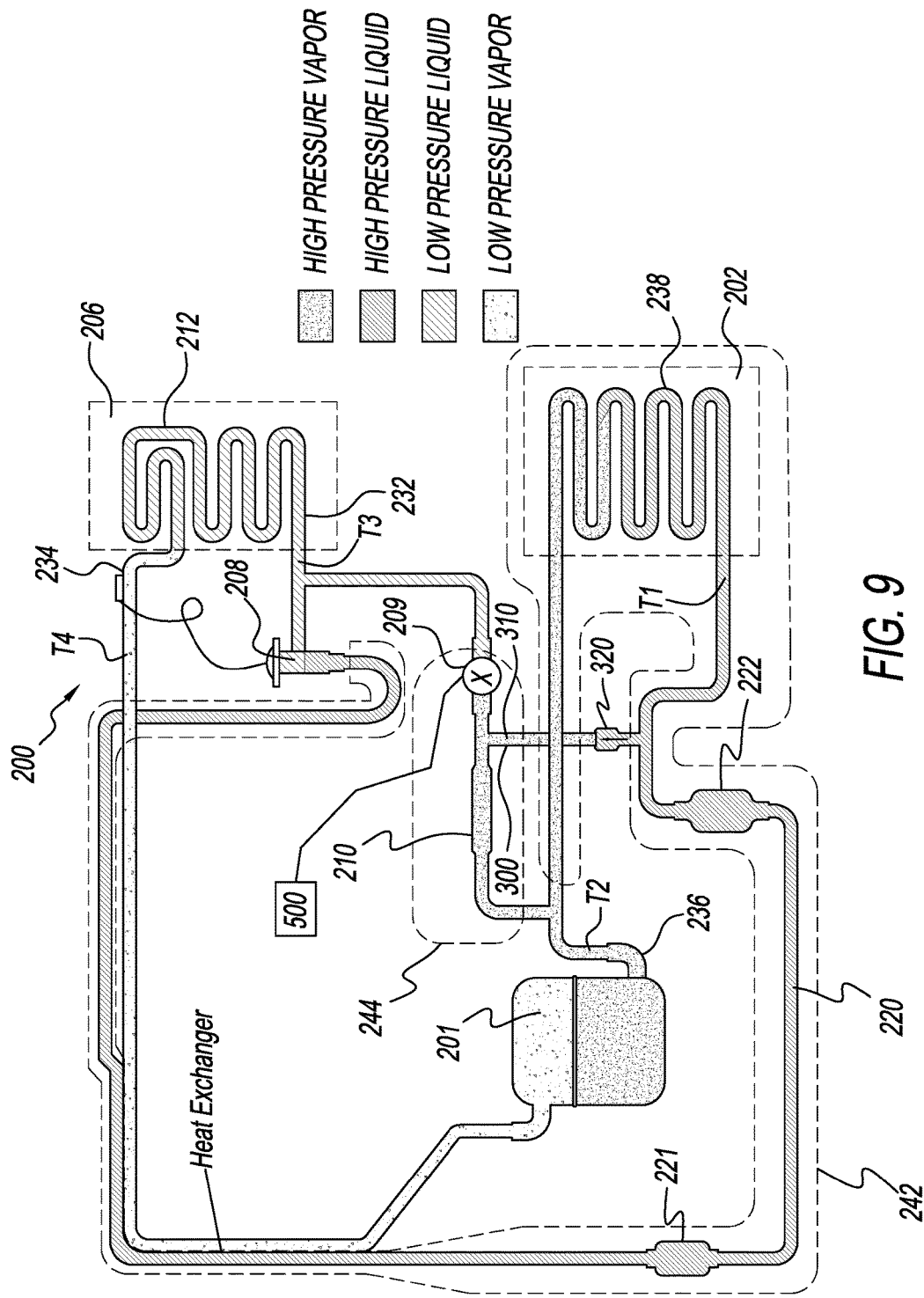
FIG. 9 provides a line diagram describing the refrigerant system having the liquid line to harvest line bypass of FIG. 8 in a freeze mode.

Referring to FIG. 9, refrigerant system 200 is shown in the freeze mode. Evaporator 206 has low-pressure liquid 232 that expands, absorbs heat, and evaporates, changing to a low-pressure vapor 234 in evaporator serpentine 212. Compressor 201 pumps low-pressure vapor 234 from an outlet of evaporator 206 to condenser 202 increasing the pressure of low-pressure vapor 234 forming high pressure vapor 236 at condenser 202. In condenser 202, heat is removed from high pressure vapor 236, which then condenses and becomes a high-pressure liquid 238. This high-pressure liquid 238 drains from condenser 202 into optional receiver tank 222 to provide a buffer for refrigerant as demand varies. Expansion device 208 is between condenser 202 and evaporator 206. Immediately preceding expansion device 208 is drier 221, which prevents plugging of the valve or tube by retaining scale, dirt, and moisture. As high-pressure liquid 238 enters evaporator 206, it is subjected to a much lower pressure due to the suction of compressor 201 and a pressure drop across expansion device 208 forming low pressure liquid 232. Thus, the refrigerant tends to expand and evaporate. In order to evaporate, the liquid must absorb heat from the water passing over evaporator 206 forming low pressure vapor 234, and this cycle is repeated during the freeze mode. Harvest solenoid valve 209 is closed during the freeze mode blocking flow of refrigerant between compressor 201 and evaporator 206.

Figure 10:
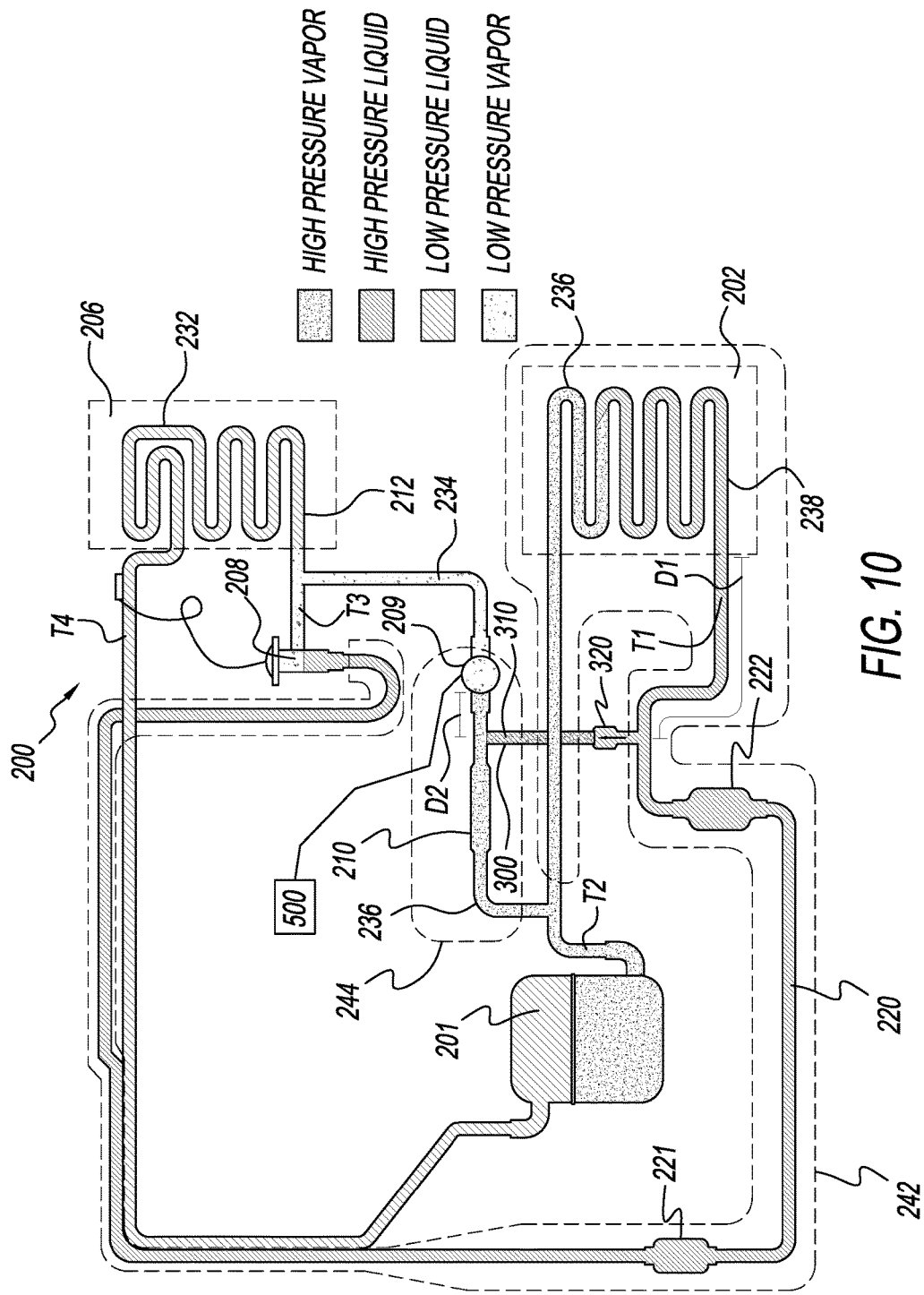
FIG. 10 provides a line diagram describing the refrigerant system having the liquid line to harvest line bypass of FIG. 8 in a harvest mode.

Referring to FIG. 10, when the ice making system 200 goes into its harvest mode, the closed harvest solenoid valve 209 is opened by controller 500 establishing a liquid line 242 and a harvest line 244. Harvest line 244 continuously circulates refrigerant so that high pressure vapor 236 is in compressor 201 to flow through refrigerant supply line 220 into evaporator 206; high pressure vapor 236 flows toward evaporator 206 through harvest solenoid valve 209 lowering the pressure to form low-pressure vapor 234; low-pressure vapor 234 flows through evaporator 206 releasing heat into evaporator 206 and forming a mixture of low pressure liquid 232 and low pressure vapor 234; and this mixture of low pressure liquid 232 and low pressure vapor 234 flows from evaporator 206 to compressor 201. Liquid line 242 has high pressure vapor 236 and high pressure liquid 238 in condenser 202 between expansion device 208 and condenser 202.

During the harvest mode, the flow of refrigerant through liquid line 242 stops and a discharge pressure of compressor 201 decreases. The drop in discharge pressure of compressor 201 results in some amount of boiling in high pressure liquid 238 in liquid line 242 and the pressure in liquid line 242 being the same or higher than the discharge pressure of compressor 201. The discharge pressure of compressor 201 generates a refrigerant flow of high pressure vapor 236 through harvest line 244 in the harvest mode. The pressure drop between compressor 201 and harvest valve 209 results in the pressure of the refrigerant flow through harvest line 244 that is lower than the compressor discharge pressure of compressor 201. Thus, a pressure in liquid line 242 is higher than a pressure in harvest line 244 during the harvest mode, resulting in flow through valve 320 drawing the refrigerant from liquid line 242 to harvest line 244. This increases the mass flow of refrigerant involved in harvesting the batch of ice, resulting in a higher suction pressure from evaporator 206 to compressor 201 during that period and thus a higher saturated refrigerant temperature inside evaporator serpentine 212 than a refrigerant system without conduit assembly 300. This results in a quicker harvest time in refrigerant system 200 than a refrigerant system without conduit assembly 300. The refrigerant has a temperature between 35 degrees Fahrenheit and 60 degrees Fahrenheit in evaporator 206 during a harvest mode.

The refrigerant that is high pressure liquid 238 in liquid line 242 reaches the differential pressure across valve 320 during the harvest mode to actuate valve 320 that is a check valve to move valve 320 to an open position for flow of high pressure liquid 238 through valve 320 and conduit 310 from liquid line 242 to harvest line 244 due to a pressure of high pressure liquid 238 being higher in liquid line 242 than a pressure of lower-pressure vapor of the refrigerant in harvest line 244. Alternatively, a controller, for example, controller 500, actuates valve 320 that is a solenoid valve to move valve 320 into an open position for flow of high pressure liquid 238 through valve 320 and conduit 310 from liquid line 242 to harvest line 244 due to a pressure of high pressure liquid 238 being higher in liquid line 242 than a pressure of lower-pressure vapor of the refrigerant in harvest line 244.

The refrigerant charge limits imposed on hydrocarbons used as a refrigerant in refrigerant systems necessitates design efforts to reduce system volume so the machine functions properly with the small charge amount. These design decisions may include microchannel condensers and shorter liquid lines in order to reduce the amount of refrigerant that is in its densest state (liquid) during the freeze mode. Nonetheless, when the machine transitions from the freeze mode to the harvest mode there will be a significant amount of refrigerant in a liquid state from condenser 202 to expansion device 208 in liquid line 242 that will no longer be flowing in refrigerant system 200. As the discharge pressure of compressor 201 decreases during the harvest mode and some of the refrigerant in liquid line 242 boils, some amount of the refrigerant will flow backwards through condenser 202 and into harvest line 244, but most of the refrigerant will remain stagnant in liquid line 242 until the harvest mode is completed and refrigerant system 200 returns to the freeze mode. It has been found by the present disclosure that is desirable during the harvest mode to transfer some of the refrigerant from liquid line 242 into harvest line 244 to increase a refrigerant mass flow that increases suction pressure and saturated suction temperature to better warm evaporator 206 and harvest a batch of ice formed on evaporator plate 6 of FIG. 3. It has also been found by the present disclosure that this would be especially important during low ambient operation when an enthalpy of the refrigerant in a liquid state is lower during the freeze mode in condenser 202 and liquid line 242.

It has also been found by the present disclosure that a refrigerant system using refrigerant system 200 and less than 150 grams of a hydrocarbons refrigerant can operate within an ambient temperature range of between 35 degrees Fahrenheit to 110 degrees Fahrenheit. This temperature range is similar to a refrigerant system using current hydrofluorocarbon refrigerants or an R 290 refrigerant in an amount that is greater than 150 grams. In contrast, a refrigerant system using a conventional refrigerant component layout with less than 150 grams of a hydrocarbons refrigerant could operate within an ambient temperature range of between 50 degrees Fahrenheit to 110 degrees Fahrenheit and would have reduced performance at moderate temperatures (50 degrees Fahrenheit to 70 degrees Fahrenheit).

As discussed herein the discharge pressure of compressor 201 decreases during the harvest mode and some of the refrigerant in liquid line 242 boils so that some amount of the refrigerant will flow backwards through condenser 202 and into harvest line 244, but most of the refrigerant will remain stagnant in liquid line 242 until the harvest mode is completed and refrigerant system 200 returns to the freeze mode. It is desirable to connect conduit assembly 300 to liquid line 242 in a location where the refrigerant has a high content of high pressure liquid 238 and a low content of high pressure vapor 236. Conduit assembly 300 may be connected a distance D1 away from condenser 202 in liquid line 242. Distance D1 can be between 0% and 100% of a distance between condenser 202 and expansion device 208.

Conduit assembly 300 is connected to harvest line 244 to establish a desirable pressure differential between harvest line 244 and liquid line 242. Conduit assembly 300 may be connected a distance D2 away from harvest line valve 209 in harvest line 244. Distance D can be 0% and 100% of a distance between compressor 201 and harvest line valve 209.

Upon completion of the harvest mode, the opened harvest solenoid valve 209 is closed by controller 500 to commence the freeze mode. During the freeze mode, there is no flow between compressor 201 and harvest line valve 209 so the pressure is the same as a discharge pressure of compressor 201. There is some amount of pressure drop through condenser 202, so the pressure between condenser 202 and expansion device 208 is lower than the compressor discharge pressure between compressor 201 and harvest line valve 209 resulting in the refrigerant that is high pressure liquid 238 to fall below the pressure differential during the freeze mode moving valve 320 to a closed position to block flow of high pressure liquid 238 through valve 320 and conduit 310. Thus, refrigerant system 200 returns to operation in the freeze mode as shown in FIG. 9. Valve 320 that is the check valve prevents flow through conduit 310 and refrigerant system 200 during the freeze mode for operation the same as a conventional refrigerant system, for example, refrigerant system 100, during the freeze mode. Alternatively, a controller, for example, controller 500, closes valve 320 that is a solenoid valve to move valve 320 into a closed position for blocking flow of high pressure liquid 238 through valve 320 and conduit 310 in the freeze mode.

Conduit assembly 300 does not require an expensive configuration of valves in contrast to a configuration connecting an evaporator to a liquid receiver in a refrigerant system. Accordingly, conduit assembly 300 provides desirable cost benefits.

Figure 11:
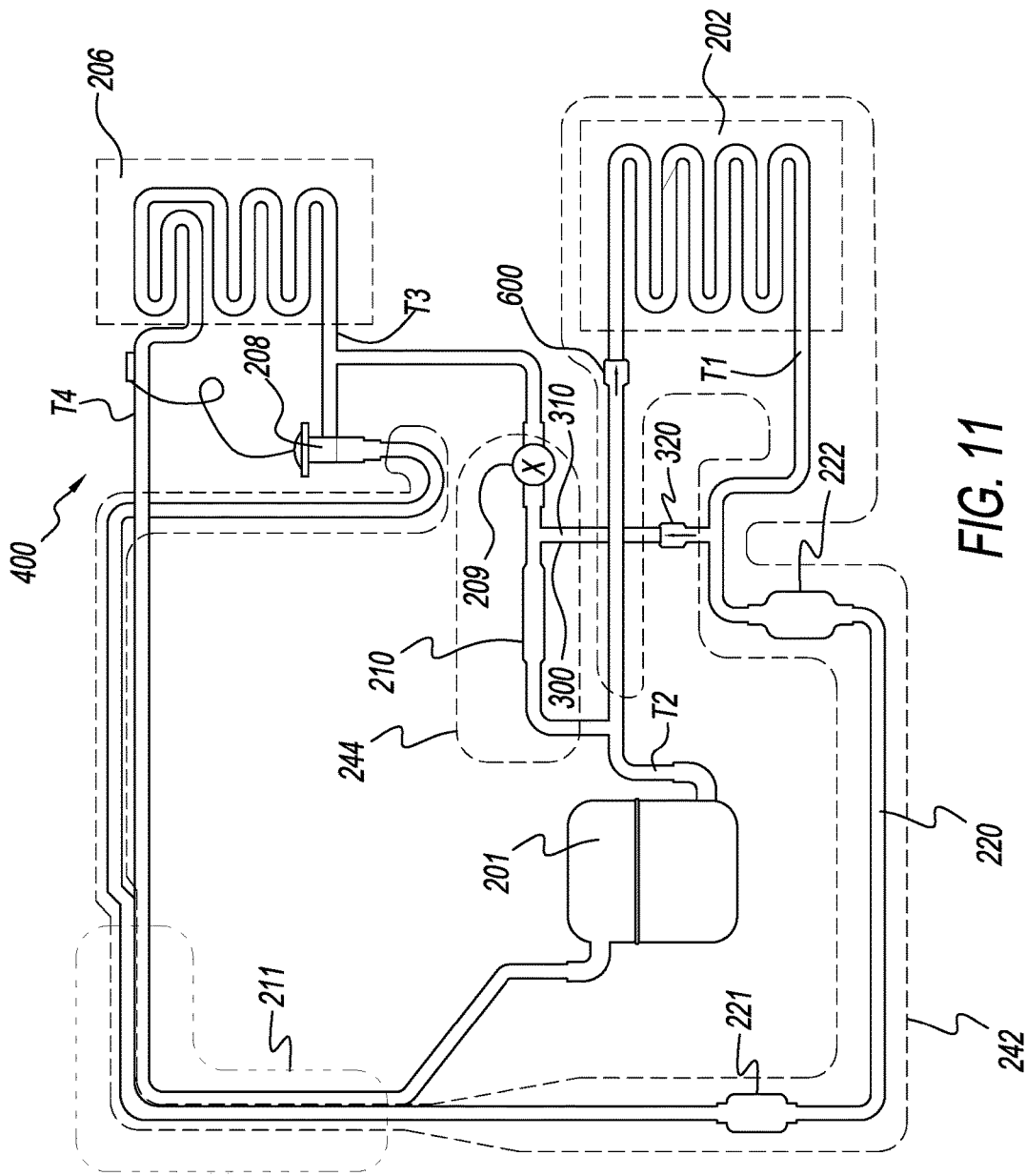
FIG. 11 provides a line diagram describing a refrigerant system having the liquid line to harvest line bypass and a check valve at an inlet of a condenser of the present disclosure.
Figure 12:
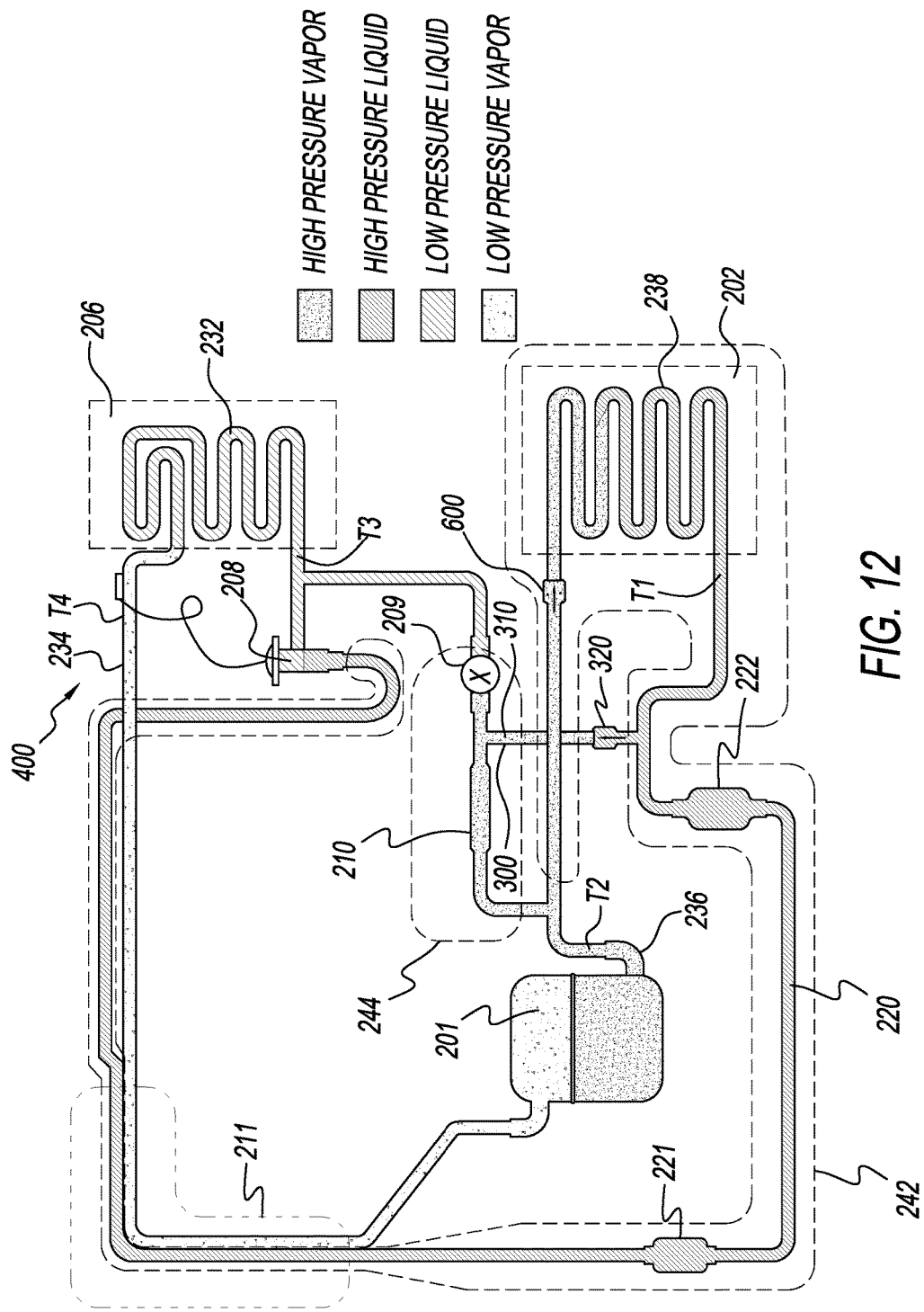
FIG. 12 provides a line diagram describing the refrigerant system having the liquid line to harvest line bypass and the check valve at the inlet of the condenser of FIG. 11 in freeze mode.
Figure 13:
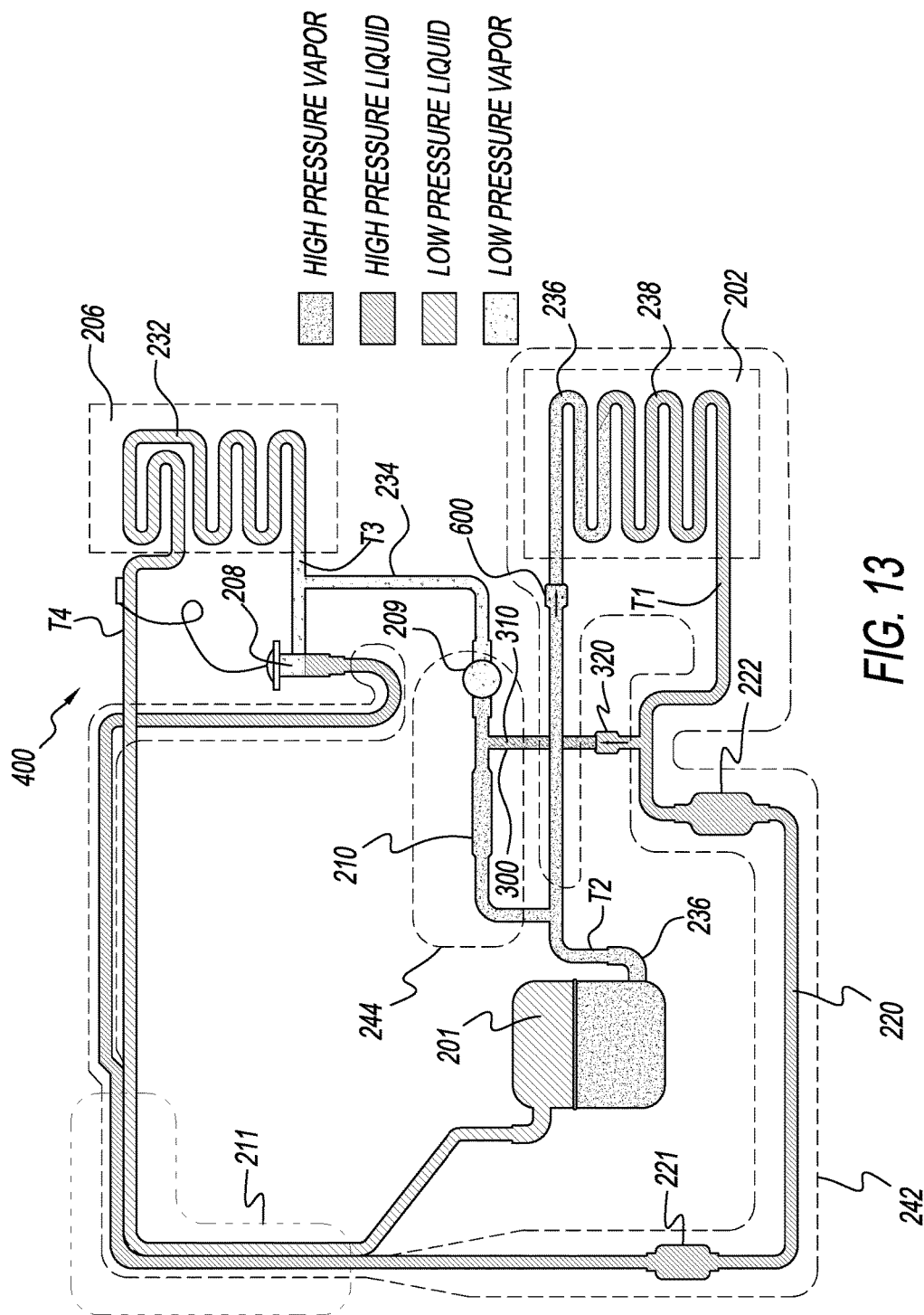
FIG. 13 provides a line diagram describing the refrigerant system having the liquid line to harvest line bypass and the check valve at the inlet of the condenser of FIG. 11 in harvest mode.

Referring to FIG. 11 an exemplary embodiment of another refrigerant system of the present disclosure is generally referred to by 400. Refrigerant system 400 is the same as refrigerant system 200 except that refrigerant system 400 includes a valve 600. The features of refrigerant system 400 that are the same as refrigerant system 200 have the same reference numerals. Valve 600 at the inlet of condenser 202 is oriented to allow flow into condenser 202 but not out of condenser 202. Valve 600 does not affect flow of refrigerant during the freeze mode, but would prevent refrigerant from backing out of condenser 202 during the harvest mode. This prevention of backwards flow would force all the refrigerant flowing out of liquid line 242 during the harvest mode to travel through conduit assembly 300 from liquid line 242 to harvest line 244. This ensures that what is traveling out of liquid line 242 is refrigerant in its densest state (liquid) and gets the maximum amount of mass into the refrigerant flow path during the harvest mode.

An additional benefit of refrigerant system 200 and refrigerant system 400 may be reduction in required amount of refrigerant in a commercial ice maker by elimination of high-side refrigerant storage vessels, for instance a receiver utilized in a water-cooled system. Such vessels are sometimes included in systems with small condenser volume to increase the refrigerant charge in those systems to improve performance.

It should also be noted that the terms "first", "second", "third", "upper", lower, and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A refrigerant system comprising:
a compressor connected to a first valve forming a harvest line, said first valve being in an open position in a harvest mode and in a closed position in a freeze mode;
a condenser connected to said compressor by a first segment of conduit and an expansion device by a second segment of conduit, said condenser and said second segment of conduit forming a liquid line; and
a third segment of conduit connected to said liquid line and said harvest line, said third segment of conduit having a second valve, said second valve allowing flow of refrigerant from said liquid line to said harvest line through said third segment of conduit in an open position and said second valve blocking flow of said refrigerant from said liquid line to said harvest line through said third segment of conduit in a closed position, a pressure in said liquid line being higher than a pressure in said harvest line during the harvest mode resulting in flow through said second valve drawing said refrigerant from said liquid line to said harvest line.

2. The refrigerant system of claim 1, wherein said second valve is a check valve.

3. The refrigerant system of claim 1, wherein said second valve is a solenoid valve.

4. The refrigerant system of claim 1, further comprising a third valve in said first segment of conduit at an inlet of said condenser.

5. The refrigerant system of claim 4, wherein said third valve is a check valve.

6. The refrigerant system of claim 1, wherein said refrigerant is a hydrocarbon refrigerant, and wherein 150 grams or less of said hydrocarbon refrigerant is in the refrigerant system.

7. The refrigerant system of claim 1, further comprising an evaporator connected to said compressor through said first valve on a first side, and wherein said evaporator is connected to said condenser through an expansion device on said first side, wherein said first valve is in said closed position in said freeze mode so that said refrigerant continuously circulates from said compressor to said condenser to said evaporator and back to said compressor, and wherein said second valve is in said closed position blocking flow of said refrigerant from said liquid line to said harvest line through said third segment of conduit in said freeze mode.

8. The refrigerant system of claim 1, further comprising an evaporator connected to said compressor through said first valve on a first side, and wherein said evaporator is connected to said condenser through an expansion device on said first side, wherein said first valve is in said open position in said harvest mode so that said refrigerant continuously circulates from said compressor to said evaporator and back to said compressor, and wherein said second valve is in said open position allowing flow of refrigerant from said liquid line to said harvest line through said third segment of conduit in said harvest mode.

9. The refrigerant system of claim 1, wherein said third segment of conduit is connected to said harvest line at an inlet of said first valve.

10. The refrigerant system of claim 1, wherein said third segment of conduit is connected to said liquid line at an outlet of said condenser.

11. The refrigerant system of claim 1, wherein said refrigerant has a temperature between 35-60 degrees Fahrenheit in said evaporator during said harvest mode.

12. A method circulating refrigerant in refrigerant system during a harvest mode, the method comprising:
  circulating a first portion of refrigerant through a compressor, a first valve, an evaporator and back to said compressor during the harvest mode, said compressor and said first valve are connected by a first segment of conduit forming a harvest line, said first valve being in an open position in the harvest mode and in a closed position in a freeze mode;
  providing a second segment of conduit that connects a condenser and an expansion device forming a liquid line;
  flowing a second portion of said refrigerant through a third segment of conduit that connects said harvest line and said liquid line during said harvest mode, a pressure in said liquid line being higher than a pressure in said harvest line during the harvest mode resulting in flow through said second valve drawing said second portion of said refrigerant from said liquid line to said harvest line.

13. The method of claim 12, further comprising energizing a second valve in said third segment of conduit prior to said flowing said second portion of said refrigerant to move said second valve to an open position.

14. The method of claim 13, further comprising de-energizing said second valve to move said second valve to a closed position to block flow of said second portion of said refrigerant in said freeze mode.

15. The method of claim 12, further comprising opening a second valve in said third segment of conduit prior to said flowing said second portion of said refrigerant, wherein said second valve opens due to a first pressure of said first portion of said refrigerant being less than a second pressure of said second portion of said refrigerant.

16. The method of claim 15, further comprising closing said second valve to move said second valve to a closed position to block flow of said second portion of said refrigerant in said freeze mode, wherein said second valve closes due to said first pressure of said first portion of said refrigerant being greater than said second pressure of said second portion of said refrigerant.

17. A refrigerant system comprising:
  a compressor connected to a first valve forming a harvest line, said first valve being in an open position in a harvest mode and in a closed position in a freeze mode;
  a condenser connected to said compressor by a first segment of conduit and an expansion device by a second segment of conduit, said condenser and said second segment of conduit forming a liquid line; and
  a third segment of conduit being connected on a first end to said harvest line and a second end to said liquid line, said third segment that is between said first end and said second end being separate from said harvest line and said liquid line, said third segment of conduit having a second valve, said second valve allowing flow of refrigerant from said liquid line to said harvest line through said third segment of conduit in an open position and said second valve blocking flow of said refrigerant from said liquid line to said harvest line through said third segment of conduit in a closed position.

* * * * *